United States Patent
Supino

(10) Patent No.: US 9,202,496 B2
(45) Date of Patent: Dec. 1, 2015

(54) COMPENSATING FOR VOICE COIL MOTOR AND MICROACTUATOR DISTURBANCE IN A HARD DRIVE

(71) Applicant: Seagate Technology LLC, Cupertino, CA (US)

(72) Inventor: Lou Supino, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/188,844

(22) Filed: Feb. 25, 2014

(65) Prior Publication Data

US 2015/0243313 A1 Aug. 27, 2015

(51) Int. Cl.
  *G11B 5/58* (2006.01)
  *G11B 5/596* (2006.01)
  *G11B 5/48* (2006.01)
  *G11B 19/04* (2006.01)

(52) U.S. Cl.
  CPC .......... *G11B 5/59694* (2013.01); *G11B 5/4873* (2013.01); *G11B 5/58* (2013.01); *G11B 5/59622* (2013.01); *G11B 19/042* (2013.01)

(58) Field of Classification Search
  CPC ............. G11B 5/5582; G11B 5/59694; G11B 19/042; G11B 5/54; G11B 5/55; G11B 5/56; G11B 5/58; G11B 5/4873; G11B 5/59622
  USPC .......... 360/264.7, 266.4, 294.5, 97.19, 97.12, 360/75
  See application file for complete search history.

(56) References Cited

U.S. PATENT DOCUMENTS

| | | | |
|---|---|---|---|
| 6,088,187 A * | 7/2000 | Takaishi | 360/78.05 |
| 6,310,746 B1 * | 10/2001 | Hawwa et al. | 360/97.19 |
| 6,493,172 B1 | 12/2002 | Morris et al. | |
| 6,741,417 B2 | 5/2004 | Hsin et al. | |
| 7,035,041 B1 * | 4/2006 | Guo et al. | 360/78.05 |
| 7,106,552 B2 * | 9/2006 | Hirano et al. | 360/78.05 |
| 7,869,157 B2 | 1/2011 | Nagashima et al. | |
| 8,780,489 B1 * | 7/2014 | Gayaka et al. | 360/78.05 |
| 2001/0036026 A1 * | 11/2001 | Chen et al. | 360/31 |
| 2002/0176201 A1 * | 11/2002 | Hsin et al. | 360/78.05 |
| 2003/0030937 A1 * | 2/2003 | Kohso et al. | 360/78.05 |
| 2004/0080862 A1 * | 4/2004 | Miyata et al. | 360/78.05 |
| 2009/0168232 A1 * | 7/2009 | Guo et al. | 360/78.04 |
| 2009/0310250 A1 * | 12/2009 | Nagashima et al. | 360/77.04 |
| 2013/0050868 A1 | 2/2013 | Kinney et al. | |
| 2013/0194697 A1 * | 8/2013 | Hironaka | 360/75 |

* cited by examiner

*Primary Examiner* — Thomas Alunkal
(74) *Attorney, Agent, or Firm* — Hollingsworth Davis, LLC

(57) ABSTRACT

In response to positioning a read/write head of a hard drive, a voice coil motor (VCM) input signal is applied to a voice coil motor and a microactuator (PZT) input signal is applied to a microactuator. A position signal is determined in response to positioning the read/write head. A PZT component is decoupled from the position signal to determine an estimated VCM response. The estimated VCM response used to determine an estimated VCM disturbance. A VCM component is decoupled from the position signal to determine an estimated PZT response. The estimated PZT response used to determine an estimated PZT disturbance. The VCM input signal and the PZT input signal are modified respectively to compensate for the estimated VCM disturbance and the estimated PZT disturbance.

20 Claims, 7 Drawing Sheets

US 9,202,496 B2

COMPENSATING FOR VOICE COIL MOTOR AND MICROACTUATOR DISTURBANCE IN A HARD DRIVE

BACKGROUND

Some hard drives are designed with the assumption that significant movement of the drive may occur while the hard drive is operating. As such, the hard drives may include measures to compensate for shock and vibration that may occur during operation. However, even in a fixed installation, shock and vibration may be present present. For example, in a multi-drive configuration such as a disk array, the cooling fans as well as the drives themselves may generate vibrations that may be transmitted between hard drives through the structure in which they are mounted. This vibration can affect, among other things, tracking of the read/write head over the recording media. In other installations, speakers, force-feedback devices, and other vibration generating components may cause similar disturbances that affect a hard drive.

As areal density of hard drives increase, the track pitch may decrease significantly, leading to increased sensitivity to vibration that affects the read/write head. As a result, additional control mechanisms may be used to ensure read/write heads can reliably track over recording media with reduced track pitch.

SUMMARY

Various embodiments described herein are generally directed to methods, systems, and apparatuses that facilitate compensating for voice coil motor and microactuator disturbance in a hard drive. In one embodiment, a voice coil motor (VCM) input signal is applied to a voice coil motor and a microactuator (PZT) input signal is applied to a microactuator in response to positioning a read/write head of a hard drive. A position signal is determined in response to positioning the read/write head. A PZT component is decoupled from the position signal to determine an estimated VCM response. The estimated VCM response is used to determine an estimated VCM disturbance. A VCM component is decoupled from the position signal to determine an estimated PZT response. The estimated PZT response is used to determine an estimated PZT disturbance. The VCM input signal and the PZT input signal are modified respectively to compensate for the estimated VCM disturbance and the estimated PZT disturbance.

In another embodiment, a servo controller is configured to receive a position error signal in response to positioning a read/write head of a hard drive via a dual-stage controller that drives a voice coil motor and a microactuator. A disturbance compensation signal is determined using a Q-parameterization that includes a plant model of the dual-stage controller, the voice coil motor, and the microactuator. An input signal to the dual-stage controller is modified using the disturbance compensation signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates generally to techniques for compensating for disturbances that affect a servo system that positions a read/write head of a hard disk drive. One technique for dealing with disturbance is known as feed-forward compensation. A feed-forward compensator generally operates by measuring vibration (e.g., via an accelerometer or piezoelectric sensor) and using the measurement to form a compensation signal. The compensation signal is combined with an actuator control signal to mitigate the effects of the disturbance.

While feed-forward compensation can be effective, it is not without its drawbacks. For example, the sensors may be susceptible to noise, which can cause erroneous compensation signals to be sent to the actuator. The actuator that moves the read/write head may be frequency limited, e.g., unable to reject disturbances above a certain frequency range. Due to the sensor placement of complexity of the structures, there may be only partial correlation between what the sensors detect and what is being experienced at the read/write head. Disturbance rejection may be inconsistent in the presence of variable narrow-band and wide-band disturbances.

Figure 1:
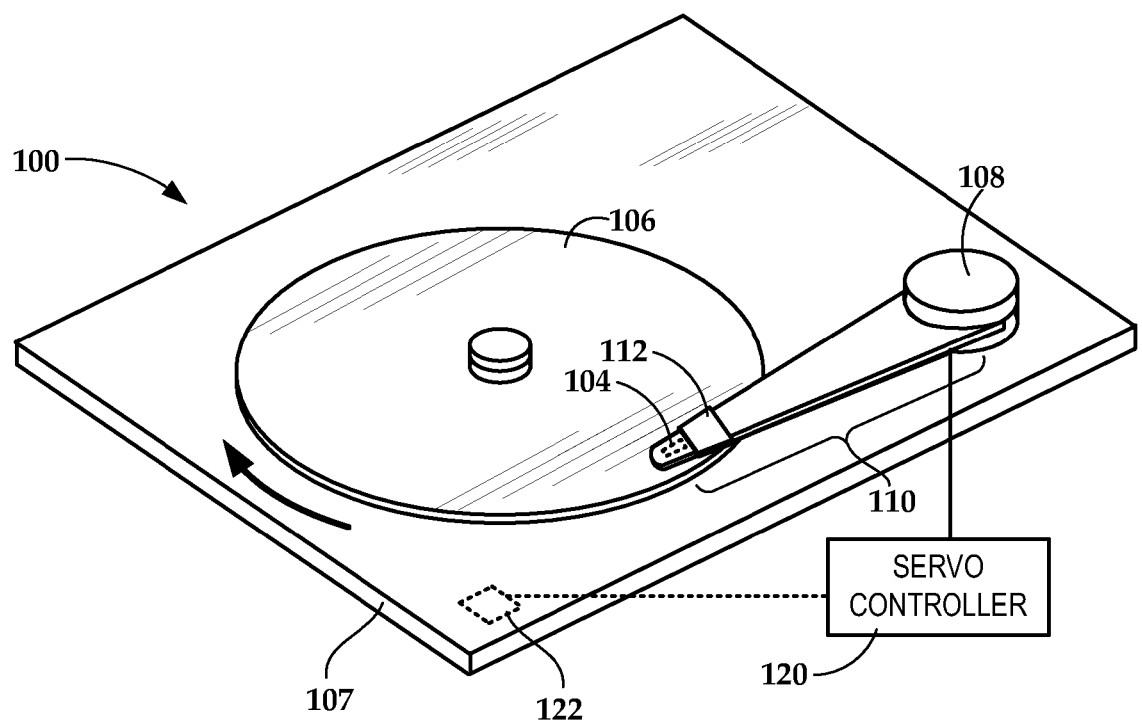
FIG. 1 is a perspective view of an apparatus according to an example embodiment.

The present disclosure describes architectures for sensorless disturbance estimation. The architectures provide disturbance compensation for hard disk drives without utilizing a vibration sensor input. The architecture may be used on devices without vibration sensors, may be used in a device where vibration sensors are included but not activated in some modes, and/or used to augment feed-forward control that includes vibration sensors. The proposed architectures are for dual-stage actuator servo systems. Such a system is shown in FIG. 1, which is a perspective view that illustrates components of an apparatus 100 according to an example embodiment.

The apparatus 100 utilizes a dual-stage actuating system to position a slider 104 over a spinning magnetic media 106 (e.g., a hard disk). An electric motor (not shown) mounted on a basedeck 107 drives the media 106 to achieve the desired media velocity. The slider 104 includes a read/write head that records to and reads from the media 106. The dual-stage actuating system includes a voice coil motor (VCM) 108 that drives an arm 110 with the slider 104 mounted at the end. The dual-stage actuating system also includes a microactuator 112 mounted in the arm 110 for fine tracking control of the slider 104. The microactuator 112 may be referred to herein as a "PZT" in reference to a piezoelectric material used in some microactuators. However, such reference is not meant to limit the disclosure to PZT microactuators.

While only one arm 110 and slider 104 is shown, the apparatus 100 may include multiple such arms, one for each surface of each disk 106 employed in the apparatus 100. Each arm may contain a microactuator for individual fine tracking control, although all arms may be commonly driven by the VCM 108. A servo controller 120 is capable of being electrically coupled to the microactuator 112 and VCM 108 to apply control signal. The servo controller 120 may also be coupled to read data back from the microactuator 112, VCM 108, and/or slider 104, e.g., position signals, sensor data. The servo controller 120 includes at least one of a processor, memory, and specialized logic and analog circuitry (e.g., digital signal processing circuitry).

The illustrated microactuator 112 is shown located within a suspension of the arm 110. In other configurations, the microactuator 112 may be positioned elsewhere, such as between the end of the arm 110 and the slider 104. Generally, the microactuator 112 may be located anywhere in the apparatus 100 where it can assist a primary control component such as the VCM 108. The functions of the microactuator 112 may include fine/fast tracking and seeking control, reduction of run-out and other functions that generally improve drive performance. While the illustrated dual-stage actuating system is shown as driving a pivoting arm 110, concepts described below may be applicable to other types of drive systems, e.g., linear tracking arms.

One or more vibration sensors 122 can be located on the basedeck 107 and/or on any other hard drive component. The vibration sensor 122 measures rotational and/or linear vibration, which is used by the servo controller 120 for feed-forward compensation. Because the servo controller 120 implements a sensorless, dual-stage disturbance estimator, the vibration sensors 122 may be optional. The sensorless, dual-stage estimator provides a flexible solution which allows the most suitable actuator (VCM or microactuator) to adaptively compensate disturbances in different frequency ranges. Two architectures with different structures are described that achieve similar results.

Figure 2:
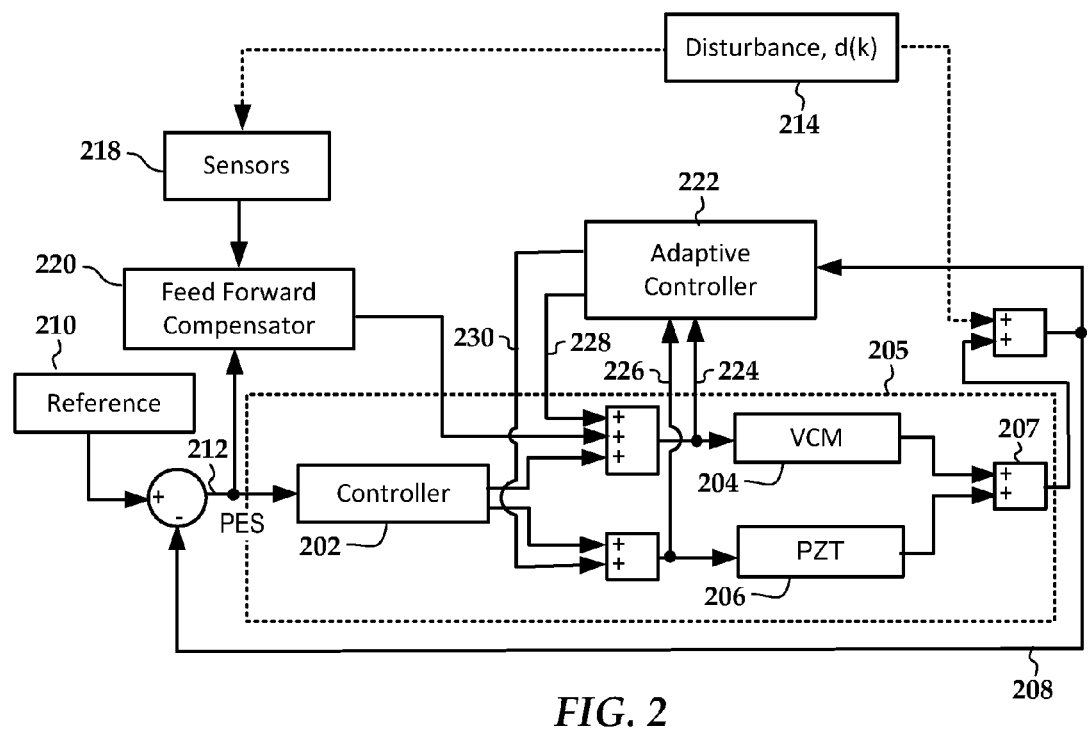
FIG. 2 a block diagram of a dual-stage control system according to an example embodiment.

In reference now to FIG. 2, a control diagram illustrates dual-stage servo control according to a first example embodiment. Generally, a controller 202 provides signals to drive a VCM 204 and microactuator 206. The VCM 204 and microactuator 206 together change a position of a read/write head, as indicated by block 207. A reference input 210 is a command that drives the read/write head to a particular position. The actual position 208 is dual-stage servo response to the reference input 210 plus disturb 214. The difference between the reference position 210 and actual position 208 is defined as position error signal (PES) 212. The PES 212 is fed back to the controller 202, and the system attempts to maintain a zero value of PES 202 during steady state operations, e.g., tracking.

Disturbance 214 represents exogenous forces affecting the read/write head. The disturbance 214 affects position of the read/write head, and the feedback path (position signal 208) is used to offset the effects of disturbance. In addition, the disturbance may be detected by a vibration sensor 218 that is mounted on the device. A signal from the sensor 218 is processed by a feed-forward compensator 220. In this example, the feed-forward compensator 220 sends a compensation signal to the VCM 204.

While the same disturbance 214 is shown affecting both read/write head position 208 and sensor 218, it will be understood that the actual manifestation of the disturbance may be significantly different. For example, the structural path between the sensors 218 and read/write head is complex and may exhibit a somewhat unpredictable response over a wide range of frequencies and operating conditions. Also, the feed-forward is only applied to the VCM 204 in this example, as the feed-forward compensator 220 may not be able to compensate for high frequency disturb in some cases.

To augment and/or replace the feed-forward compensator 220, an adaptive controller 222 is used to provide sensorless, dual stage, disturbance rejection. The adaptive controller 222 receives respective input signals 224, 226 applied to the VCM 204 and microactuator 206, and provides respective compensation signals 228, 230. The adaptive controller 222 also uses the position signal 208, as will be shown in greater detail in FIG. 3.

Figure 3:
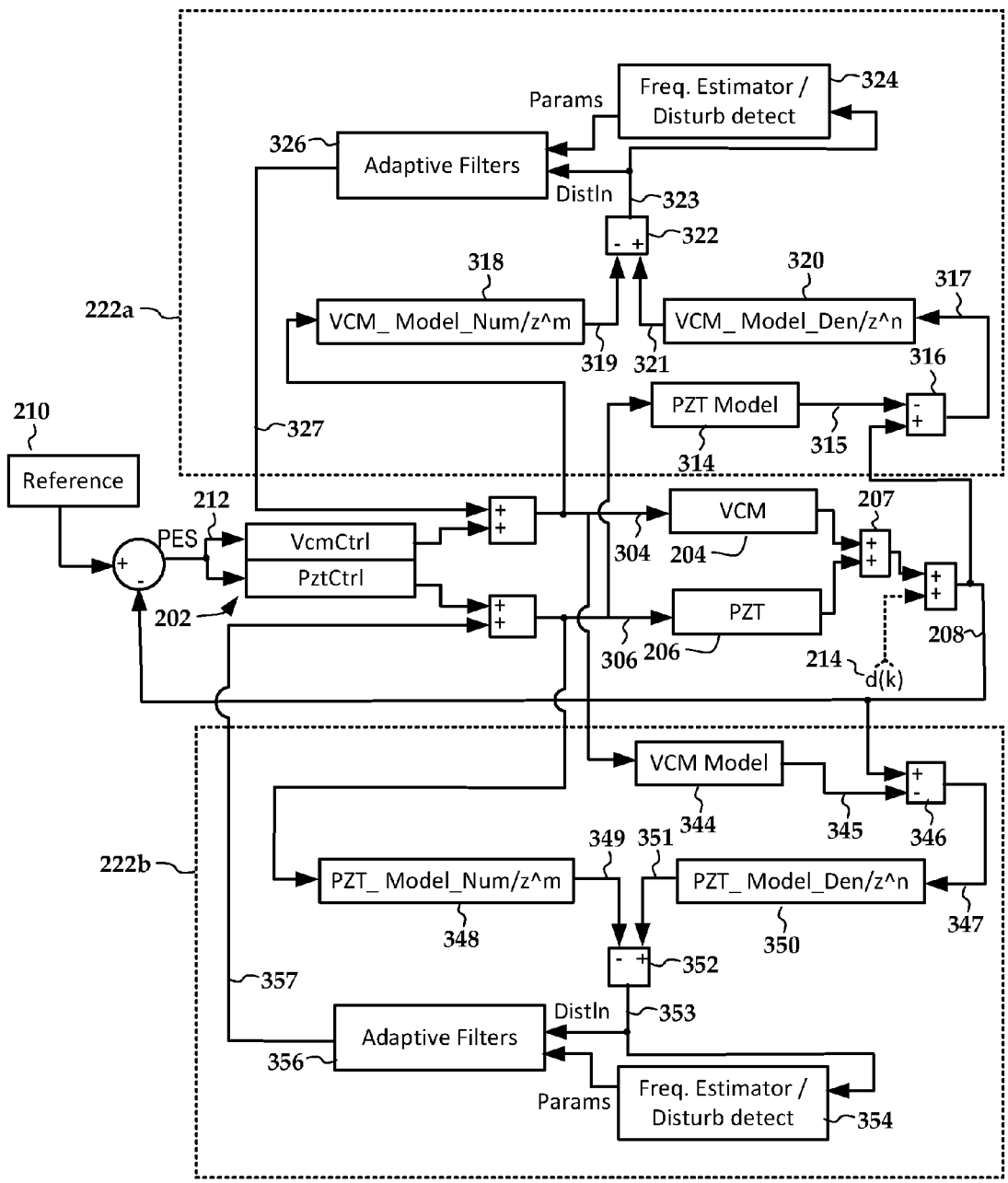
FIG. 3 is a block diagram showing an example configuration of the adaptive controller shown in FIG. 2.

In FIG. 3, a block diagram illustrates additional details of the adaptive controller 222 shown in FIG. 2. As seen in FIG. 3, the adaptive controller 222 includes two sections, 222a and 222b. Controller section 222a provides disturbance compensation for the VCM 204 and section 222b provides disturbance compensation for the microactuator 206. Each of these sections 222a, 222b computes a disturbance estimate for respective VCM 204 and microactuator 206, creating an independent application of each disturbance rejection for each. These sections 222a, 222b may be configured as an "add-on feature" that determines/modifies the control effort to each actuator component.

Both controller sections utilize the position signal 208 in order to estimate respective response of the VCM 204 and microactuator 206. For example, section 222a takes the input signal 306 applied to the microactuator 206 and applies this to a PZT model 314. The resulting output 315 is an estimated PZT component of the position 208, which is then subtracted from the position at block 316. The resulting signal 317 is decoupled from the PZT components of position, and this signal 317 is transformed at block 320 via a denominator of a VCM transfer function (poles). The resulting output is a VCM plus disturb component 321 of the position signal.

The input signal 304 of the VCM 204 is transformed at block 318 via a numerator of the VCM transfer function (zeroes). This results in an estimate VCM component 319 of the of position signal. The estimate VCM component 319 is subtracted VCM plus disturb component 321. Accordingly, the output of block 322 is an estimate 323 of VCM disturbance.

The VCM disturb estimate 323 may optionally be adaptively filtered, shown here being processed by a frequency estimator/disturbance detector block 324 (e.g., lattice filter, Goertzel filter, discrete Fourier transform) and an adaptive filter block 326. The adaptive filter block 326 may use, but is not limited to, a joint process estimator (JPE), finite impulse response (FIR), bandpass filter (BPF), lowpass filter (LPF), etc. The output 327 of the controller section 222a is a disturbance estimate that can be used to cancel and/or reduce the disturbance, whether the disturbance is broadband and/or narrowband.

In section 222b, an input signal 304 applied to the VCM 204 is input to a VCM model 344. The resulting output 345 is an estimated VCM component of the position 208, which is then subtracted from the position 208 at block 346. The resulting signal 347 is decoupled from the VCM components of position, and this signal 347 is transformed at block 350 via a denominator of a PZT transfer function (poles). The resulting output is a PZT plus disturb component 351 of the position signal.

The input signal 306 of the microactuator 206 is transformed at block 348 via a numerator of the PZT transfer function (zeroes). This results in an estimated PZT component 349 of the position signal. The estimated PZT component 349 is subtracted from the PZT plus disturb component 351. Accordingly, the output of block 352 is an estimate 353 of PZT disturbance.

The microactuator disturb estimate 353 may optionally be adaptively filtered, shown here being processed by an optional frequency estimator/disturbance detector block 354 (e.g., lattice filter, Goertzel filter, discrete Fourier transform) and an adaptive filter block 356. The adaptive filter block 356 may use, but is not limited to, a JPE, FIR, BPF, LPF, etc. The output 357 of the controller section 222b is a disturbance estimate that can be used to cancel/reduce a broadband and/or narrowband disturbance.

The total sensitivity function of the control systems shown in FIGS. 2 and 3 is a product of the baseline sensitivity and the sensitivity of the "add-on" feature, in this case the adaptive controller 222. This is shown in Equation [1] below, where the baseline sensitivity is represented by the terms in the left hand set of square brackets, and the add-on feature is represented by the terms in the right square brackets. As the baseline system is stable and the adaptive controller 222 is stable, then the total system is stable. Equation [2] represents a difference equation for this system, where the Z values represent VCM and PZT delay, and the F values represent VCM and PZT adaptive filters.

$$S(z) = \left[\frac{1}{1 + Vcm*VcmCtlr + Pzt*PztCtlr}\right] * \left[\frac{(1 - F_{vcm})(1 - F_{pzt})}{(1 - F_{vcm}F_{pzt})}\right] \quad [1]$$

$$d(k) - Vcm(z)VcmCtlr(k) - Pzt(z)PztCtlr(k) = \quad [2]$$
$$[1 - z^{-VCM_m}F_{vcm}(z) - z^{-PZT_m}F_{pzt}(z)]d(k)$$

Figure 4:
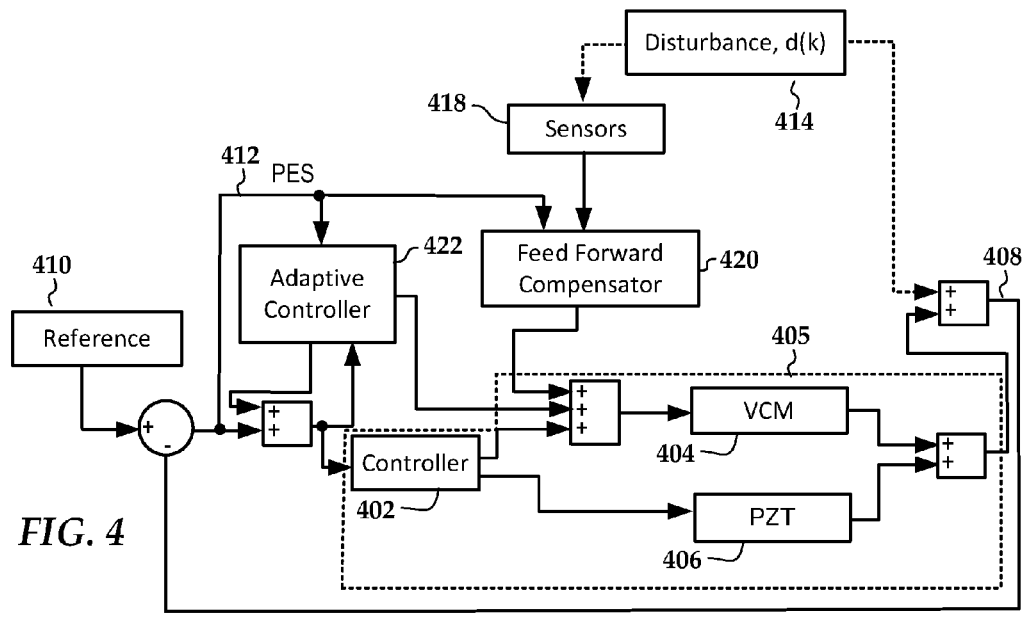
FIG. 4 a block diagram of a dual-stage control system according to another example embodiment.

In reference now to FIG. 4, a block diagram illustrates a dual-stage, servo control architecture according to a second embodiment. This embodiment uses an add-on loop shaping technique known as Q-parameterization. A dual-stage controller 402 provides signals to drive a VCM 404 and microactuator 406. Other elements, such as position/feedback signal 408, reference input 410, PES 412, disturbance 414, sensors 418, and feed-forward compensator 420 are analogous to like-named elements described in relation to FIG. 2. An adaptive controller 422 configured as a dual-stage disturbance estimator is placed in front of the nominal dual stage controller 402. The input to the nominal dual-stage controller 402 is augmented to reject the estimated disturbances. The adaptive controller 422 models the control system via plant model 405, which includes controller 402, VCM 404 and microactuator 406. Using this model, a disturbance estimate is found using Q-parameterization.

Generally, Q-parameterization involves selecting a stabilizing feedback controller for a given plant as function of a single parameter, Q. For the illustrated control system, the stabilizing feedback controller can be expressed as shown in Equation [3], where Num(z) and Den(z) are respective numerator and denominator of the transfer function of the plant 205, and X(z) and Y(z) are proper and stable and satisfy the vector function Num(z)X(z)+Den(z)Y(z)=1. The total sensitivity function of this control system is shown in Equation [4], where the baseline sensitivity is represented by the terms in the left hand set of square brackets, and the add-on feature is represented by the terms in the right square brackets. The terms P(z) and C(z) in Equation [4] are taken from the transfer function expressions shown in Equations [5a]-[5c].

$$C(z) = \frac{X(z) - Den(z)Q(z)}{Y(z) - Num(z)Q(z)} \quad [3]$$

$$S(z) = \left[\frac{1}{1 + P(z)C(z)}\right] * \left[1 - \frac{Num(z)}{Y(z)}Q(z)\right] \quad [4]$$

$$Sys(z) = \frac{Num(z)}{Den(z)} \quad [5a]$$

$$Sys(z) = Vcm(z)VcmCtlr(z) + Pzt(z)PztCtlr(z) \quad [5b]$$

$$Sys(z) = P(z)C(z) \quad [5c]$$

Figure 5:
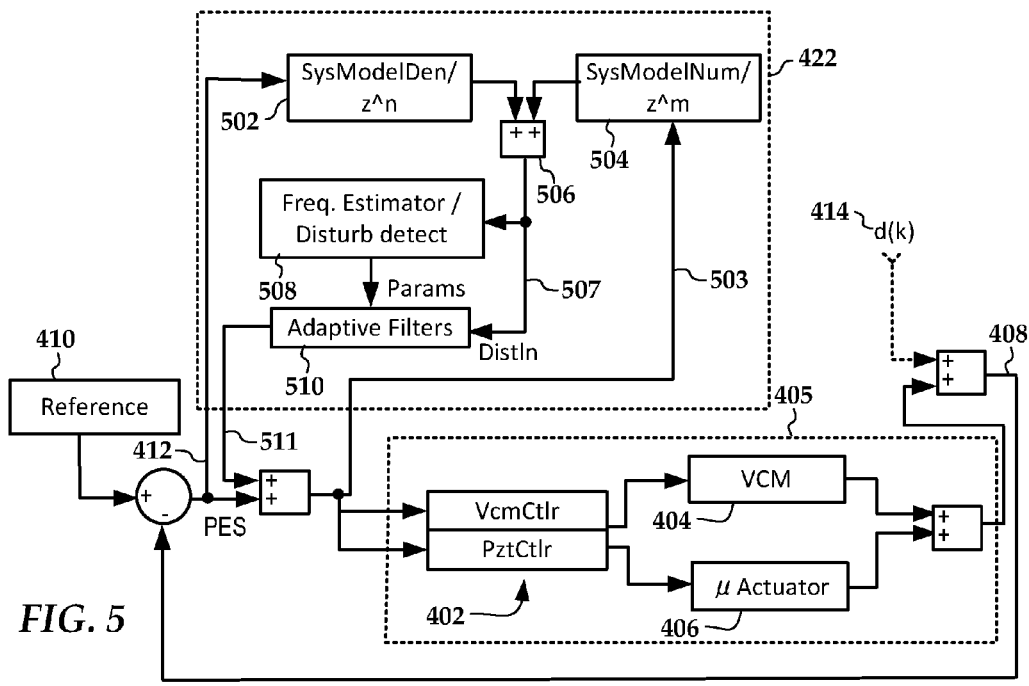
FIG. 5 is a block diagram showing an example configuration of the adaptive controller shown in FIG. 4.

In FIG. 5, a block diagram illustrates additional details of the adaptive controller 422 shown in FIG. 4. The PES 412 is input to block 502, which applies the denominator of the system transfer function (poles) and the disturbance-corrected PES 503 is input to block 504, which applies the numerator of the system transfer function (poles). The output of these blocks 502, 504 are summed at block 506, and the resulting signal 507 are input to an optional frequency estimator/disturbance detector block 508 (e.g., lattice filter, Goertzel filter, discrete Fourier transform) and an adaptive filter block 510. The adaptive filter block 510 may use, but is not limited to, a JPE, FIR, BPF, LPF, etc. The output 511 of the adaptive controller 422 is a disturbance estimate that can be used to cancel/reduce a broadband and/or narrowband disturbance.

Figure 6:
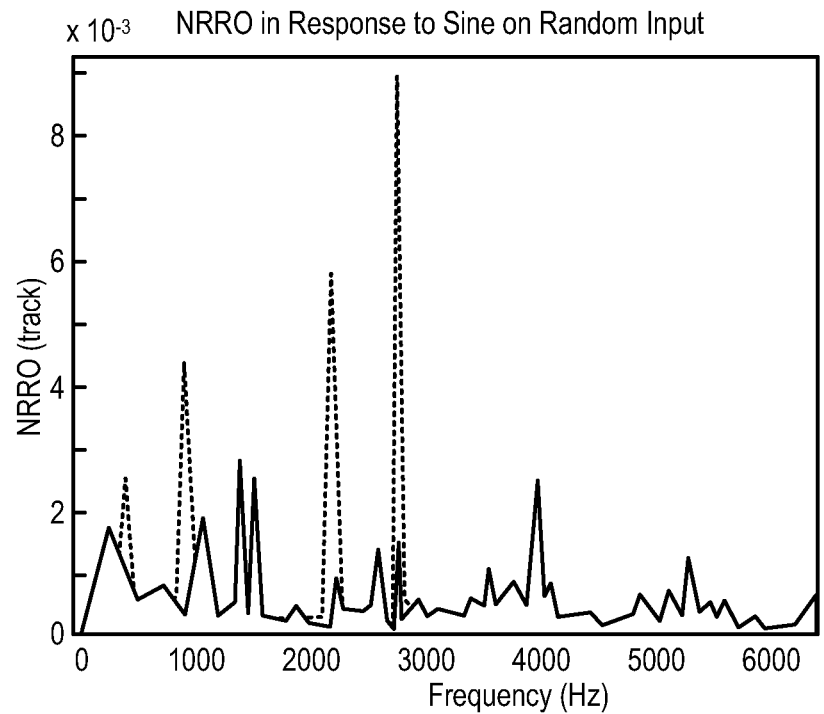
FIGS. 6 and 7 are graphs showing vibration test results of an adaptive controller according to an example embodiment.
Figure 7:
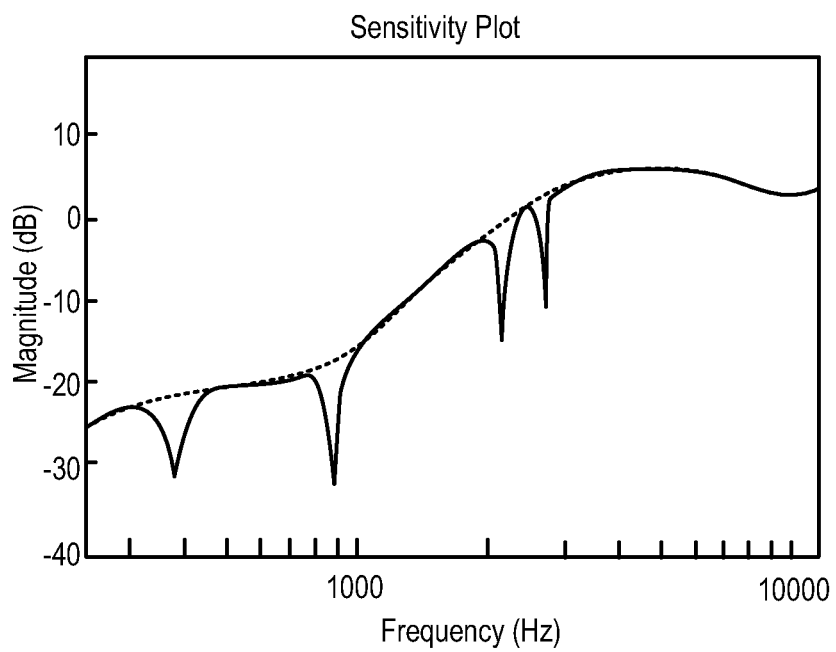

In FIGS. 6 and 7, graphs illustrate results of tests conducted using an adaptive controller as described above. Results were similar for both types of adaptive controllers shown in FIGS. 2 and 4. The graph in FIG. 6 represents an example of non-repeatable runout (NRRO) in response to a sine-on-random rotational vibration profile applied to a hard drive on a shake table. In this example, four sine tones with center frequencies ranging from 380 Hz to 2.7 kHz simulate external vibration inputs that might be generated, for example, by other hard drives, cooling fans, cooling airflow, etc. The dashed curve in FIG. 6 represents the NRRO response with the adaptive controller deactivated, and the solid curve represents NRRO response with the adaptive controller activated. The four large peaks in the dashed curve correspond to the center frequencies of the sinusoidal vibration inputs, the effects of which are mitigated by the adaptive controller as shown by the solid curve. In FIG. 7, the dashed line represents measured sensitivity of the servo system without the adaptive controller, and the solid line illustrates the sensitivity with the adaptive controller activated. The dips in sensitivity are centered around the center frequencies of the sine tones in FIG. 6, and help mitigate the disturb effects of the externally applied vibration.

Due to the dynamic environment in which a hard drive operate, a profile such as seen in FIG. 6 may be transient, and other profiles may be observed over time due to, among other things, changes in equipment operating speed, changes in ambient conditions, workload on the hard drive, etc. As such, the adaptive nature of the disturb compensation allows shifting the location and magnitude of sensitivity notches as shown in FIG. 7 to adjust for current conditions of use.

Figure 8:
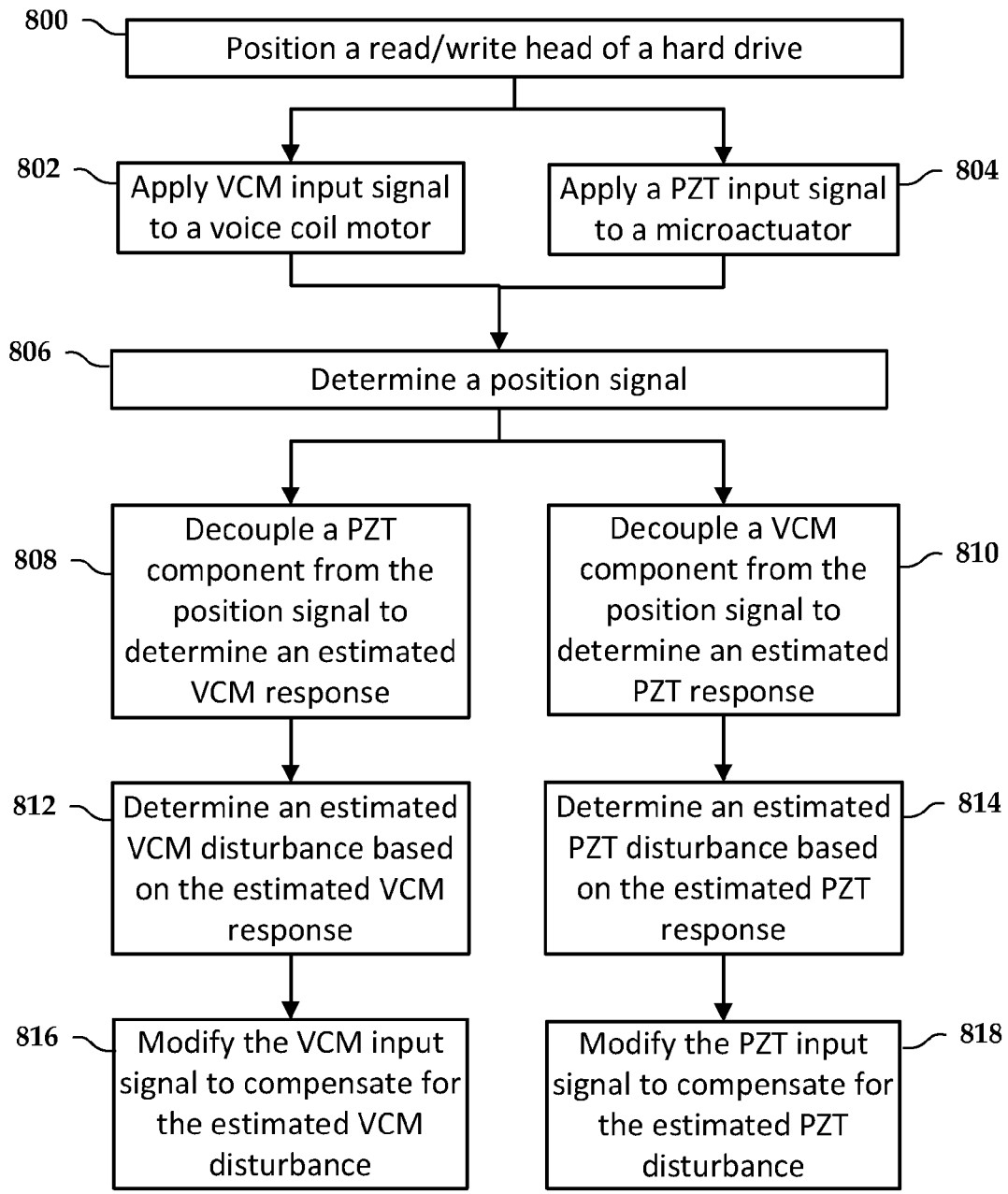
FIGS. 8 and 9 are a flowcharts showing methods according to example embodiments.

In FIG. 8, a flowchart illustrates a method according to an example embodiment. The method involves, in response to positioning 800 a read/write head of a hard drive, applying 802 a VCM input signal to a voice coil motor and applying 804 a PZT input signal to a microactuator. A position signal is determined 806 in response to positioning the read/write head.

A PZT component is decoupled 808 from the position signal to determine an estimated VCM response. The estimated VCM response is used to determine 812 an estimated VCM disturbance. The VCM input signal is modified 816 to compensate for the estimated VCM disturbance. A VCM component is decoupled 810 from the position signal to determine an estimated PZT response. The estimated PZT response used to determine 814 an estimated PZT disturbance. The PZT input signal is modified 818 to compensate for the estimated PZT disturbance.

Figure 9:
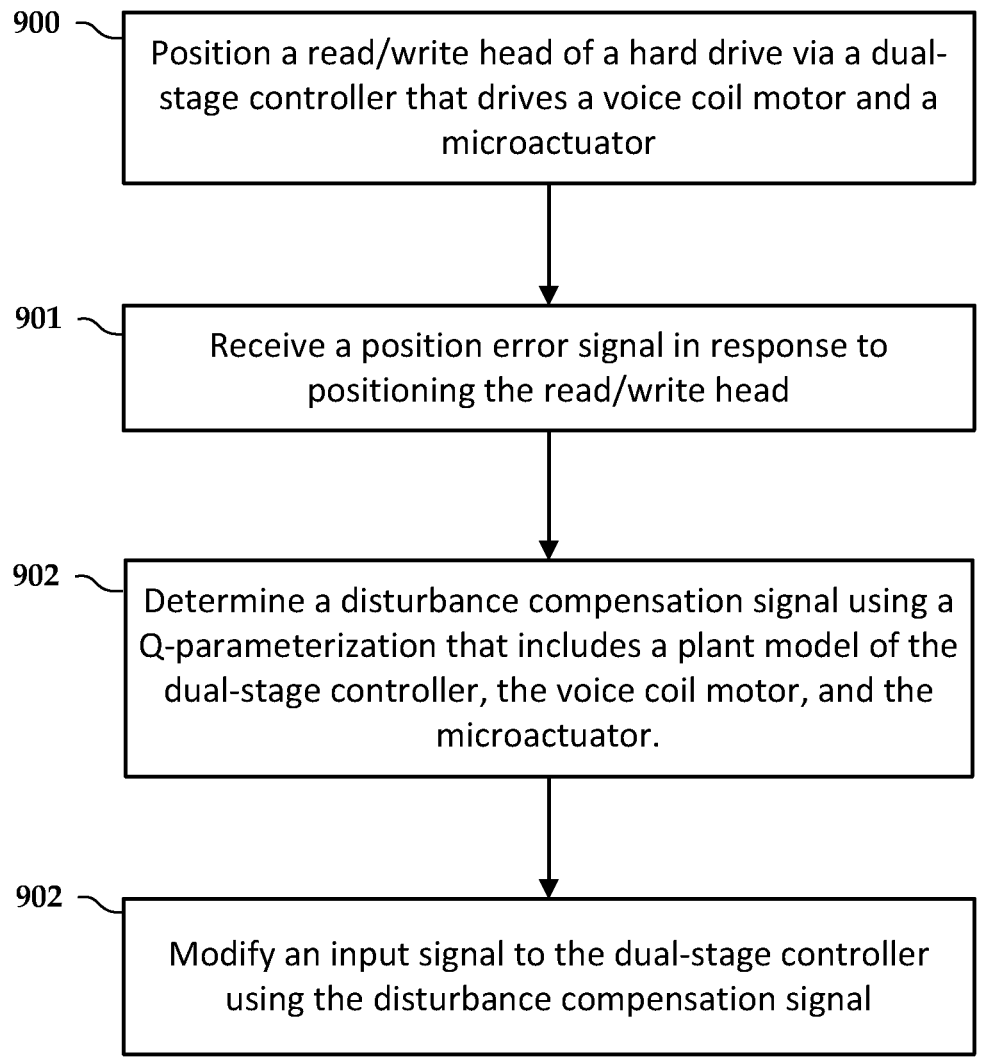

In FIG. 9, a flowchart illustrated a method according to another embodiment. The method involves positioning 900 a read/write head of a hard drive via a dual-stage controller that drives a voice coil motor and a microactuator. A position error signal is received 901 in response to the positioning of the read/write head. A disturbance compensation signal is determined 902 using a Q-parameterization that comprises a plant model of the dual-stage controller, the voice coil motor, and the microactuator. An input signal to the dual-stage controller is modified 903 using the disturbance compensation signal.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    applying a voice coil motor (VCM) input signal to a voice coil motor and a microactuator (PZT) input signal to a microactuator in response to positioning a read/write head of a hard drive;
    determining a position signal in response to positioning the read/write head;
    decoupling a PZT component from the position signal to determine an estimated VCM response, the estimated VCM response used to determine an estimated VCM disturbance;
    decoupling a VCM component from the position signal to determine an estimated PZT response, the estimated PZT response used to determine an estimated PZT disturbance; and
    modifying the VCM input signal and the PZT input signal respectively to compensate for the estimated VCM disturbance and the estimated PZT disturbance.

2. The method of claim 1, further comprising adaptively filtering the estimated VCM disturbance and the estimated PZT disturbance.

3. The method of claim 2, wherein adaptively filtering comprises using one of a lattice filter, Goertzel filter, and discrete Fourier transform to estimate disturb frequencies.

4. The method of claim 2, wherein adaptively filtering comprises using at least one of joint process estimator and finite impulse response filter.

5. The method of claim 1, further comprising modifying the VCM input signal further via a feed-forward compensator to compensate for measured VCM disturbance.

6. An apparatus comprising:
    a servo controller configured to:
        apply a voice coil motor (VCM) input signal to a VCM and a microactuator (PZT) input signal to a PZT to position a read/write head of a hard drive;
        determine a position signal in response to positioning the read/write head;
        decouple a PZT component from the position signal to determine an estimated VCM response, the estimated VCM response used to determine an estimated VCM disturbance;
        decouple a VCM component from the position signal to determine an estimated PZT response, the estimated PZT response used to determine and an estimated PZT disturbance; and
        modify the VCM input signal and the PZT input signal respectively to compensate for the estimated VCM disturbance and the estimated PZT disturbance.

7. The apparatus of claim 6, wherein the servo controller is further configured to adaptively filter the estimated VCM disturbance and the estimated PZT disturbance.

8. The apparatus of claim 7, wherein adaptively filtering comprises using one of a lattice filter, Goertzel filter, and discrete Fourier transform to estimate disturb frequencies.

9. The apparatus of claim 7, wherein adaptively filtering comprises using at least one of joint process estimator and finite impulse response filter.

10. The apparatus of claim 6, wherein the servo controller is further configured to:
    transform the VCM input signal via a VCM model to obtain an estimated VCM component of the position signal;
    transform a difference between the estimated VCM component and the position signal via a denominator of a PZT transform function to obtain a PZT plus disturb component of the position signal;
    transform the PZT input signal via a numerator of the PZT transform function to obtain an estimated PZT component of the position signal; and
    subtract the estimated PZT component from the PZT plus disturb component to obtain the estimated PZT disturbance.

11. The apparatus of claim 10, wherein the servo control processor is further configured to adaptively filter the estimated PZT disturbance.

12. The apparatus of claim 11, wherein adaptively filtering comprises using one of a lattice filter, Goertzel filter, and discrete Fourier transform to estimate disturb frequencies.

13. The apparatus of claim 6, wherein the servo controller is further configured to:
    transform the PZT input signal via a PZT model to obtain an estimated PZT component of the position signal;

transform a difference between the estimated PZT component and the position signal via a denominator of a VCM transform function to obtain a VCM plus disturb component of the position signal;

transform the VCM input signal via a numerator of the VCM transform function to obtain an estimated VCM component of the position signal; and subtract the estimated VCM component from the VCM plus disturb component to obtain the estimated VCM disturbance.

14. The apparatus of claim 13, wherein the servo controller is further configured to adaptively filter the estimated VCM disturbance.

15. The apparatus of claim 14, wherein adaptively filtering comprises using one of a lattice filter, Goertzel filter, and discrete Fourier transform to estimate disturb frequencies.

16. An apparatus comprising:
a servo controller configured to:
receive a position error signal in response to positioning a read/write head of a hard drive via a dual-stage controller that drives a voice coil motor and a microactuator;

determine a disturbance compensation signal using a Q-parameterization that comprises a plant model of the dual-stage controller, the voice coil motor, and the microactuator, the Q-parameterization comprising selecting a stabilizing feedback controller for the plant model as function of a single parameter;

modify an input signal to the dual-stage controller using the disturbance compensation signal.

17. The apparatus of claim 16, wherein the Q-parameterization determines the disturbance compensation signal based on the input signal and the modified input signal.

18. The apparatus of claim 16, wherein the servo control processor is further configured to adaptively filter the disturbance compensation signal.

19. The apparatus of claim 18, wherein adaptively filtering comprises using one of a lattice filter, Goertzel filter, and discrete Fourier transform to estimate disturb frequencies.

20. The apparatus of claim 18, wherein adaptively filtering comprises using at least one of joint process estimator and finite impulse response filter.

* * * * *